United States Patent [19]

Hayashi

[11] Patent Number: 5,212,538
[45] Date of Patent: May 18, 1993

[54] FLUORESCENCE MEASUREMENT APPARATUS WITH AN AUTOMATIC RECORDER FULL-SCALE SETTING FUNCTION

[75] Inventor: Tsutomu Hayashi, Kyoto, Japan

[73] Assignee: Shimadzu Corporation, Kyoto, Japan

[21] Appl. No.: 772,878

[22] Filed: Oct. 8, 1991

[30] Foreign Application Priority Data

Oct. 19, 1990 [JP] Japan .................. 2-283116

[51] Int. Cl.⁵ ............................... G01N 21/64
[52] U.S. Cl. ................... 356/318; 250/458.1
[58] Field of Search ............. 356/318; 250/458.1

[56] References Cited

FOREIGN PATENT DOCUMENTS 0330183  8/1989  European Pat. Off. .
63-243842 10/1988 Japan .
2024412  1/1980  United Kingdom .

OTHER PUBLICATIONS

T. Iwata et al.; "Computer-enhanced fluorescence spectroscopy"; International Laboratory, Sep. 1986, No. 7, pp. 68-74.

*Primary Examiner*—Vincent P. McGraw
*Attorney, Agent, or Firm*—Oliff & Berridge

[57] ABSTRACT

A fluorescence measurement apparatus for automatically setting the full scale of the recorder in recording the spectrum curve of the fluorescence measurement. The controller of the fluorescence measurement apparatus operates as follows: a) detects peaks of the spectrum curve, b) detects the maximum value of the peaks disregarding peaks due to a cause or causes other than the fluorescent light of the sample, and c) sets the full scale of the recorder using the detected maximum value. Operations of the automatic full scale setting are described for both the excitation spectrum measurement mode and the emission spectrum measurement mode.

18 Claims, 6 Drawing Sheets

FLUORESCENCE MEASUREMENT APPARATUS WITH AN AUTOMATIC RECORDER FULL-SCALE SETTING FUNCTION

The present invention relates to a fluorescence measurement apparatus which analyses a sample by measuring fluorescent light emitted from the sample, and especially to an automatic setting of the full scale in recording the spectrum.

BACKGROUND OF THE INVENTION

There are two methods of fluorescence measurement for analyzing a sample. One is the excitation spectrum measurement in which the wavelength of the excitation light irradiated onto the sample is changed and the corresponding change in the strength of the fluorescent light of a fixed wavelength emitted from the sample is measured. The other is the emission spectrum measurement in which monochromatic excitation light of a fixed wavelength is irradiated onto the sample and the spectrum of the fluorescent light emitted from the sample is scanned (i.e., strength at every wavelength of the spectrum is measured). The present invention relates to both of these two methods.

Conventional automatic full scale setting in recording a spectrum curve is designed so that the largest data of the spectrum (i.e., the maximum height of the spectrum curve) is recorded within the full scale range of the recorder. When such automatic full scale setting is used in a fluorescence measurement apparatus, following problem arises.

In the emission spectrum measurement method, a peak by the Rayleigh scattering appears in the spectrum at the same wavelength as the excitation monochromatic light, and the height of the Rayleigh peak is in many cases larger than the peaks of the fluorescent light from the sample. Thus the full scale of the spectrum recorder is automatically determined by the Rayleigh peak and the peaks of the fluorescent light from the sample are recorded low, which makes it difficult to determine their exact heights. In the excitation spectrum measurement method, the Rayleigh peak also appears high when the wavelength of the excitation light comes to the measurement wavelength. In this case also, the strong Rayleigh peak determines the full scale of the spectrum recorder and makes the exact measurement of comparatively faint fluorescent light difficult.

SUMMARY OF THE INVENTION

The present invention addresses the problem that arises in the spectrum recording of fluorescence measurement.

According to the present invention, in a fluorescence measurement apparatus for recording a spectrum curve of fluorescent light emitted from a sample while the sample is irradiated by an excitation light, the fluorescence measurement apparatus comprises:
  a memory for storing data of the spectrum curve;
  a recorder for recording the spectrum curve; and
  a controller for setting the full scale of the recorder that
    a) detects data corresponding to the peaks of the spectrum curve,
    b) detects the maximum value of the data of peaks disregarding peaks due to a cause or causes other than the fluorescent light of the sample, and
    c) sets the full scale of the recorder using the detected maximum value.

The peaks disregarded in b) above may include the Rayleigh peaks, its diffraction peaks and the Raman peak, which will be explained later. The fluorescence measurement apparatus of the present invention can work in both the excitation spectrum measurement mode and the emission spectrum measurement mode.

As described before, the peaks due to the Rayleigh scattering etc. of the excitation light is in most cases higher than the peaks of the fluorescent light of the sample in the spectrum curve, but such peaks need not be recorded by the recorder. The full scale setting controller disregards such peaks in determining the full scale of the recorder, whereby the peaks of the fluorescent light from the sample are recorded higher in the recorder, and the accuracy of the sample analysis is improved. Since Rayleigh scattering is caused by the scattering of the excitation light in the sample, the wavelength of the light by the Rayleigh scattering (the light is hereinafter referred to as the Rayleigh scattered light) is the same as that of the excitation light, which is known. Thus it is easy to detect the Rayleigh peak.

When a diffraction grating is used for the monochromators, higher order diffractions of the basic Rayleigh scattered light are generated. In this case, the peaks of the higher order diffractions also appear at the double, triple and further integral multiples of the wavelength of the basic Rayleigh scattered light in the spectrum curve. In the excitation spectrum mode, the peaks due to the higher diffractions appear at shorter wavelengths such as ½, ⅓, etc. of the wavelength of the basic Rayleigh scattered light in the measured spectrum.

Further features and details of the present invention is described in the following description of the preferred embodiments.

BRIEF DESCRIPTION OF THE ATTACHED DRAWINGS

DETAILED DESCRIPTION OF PREFERRED EMBODIMENTS

Figure 1:
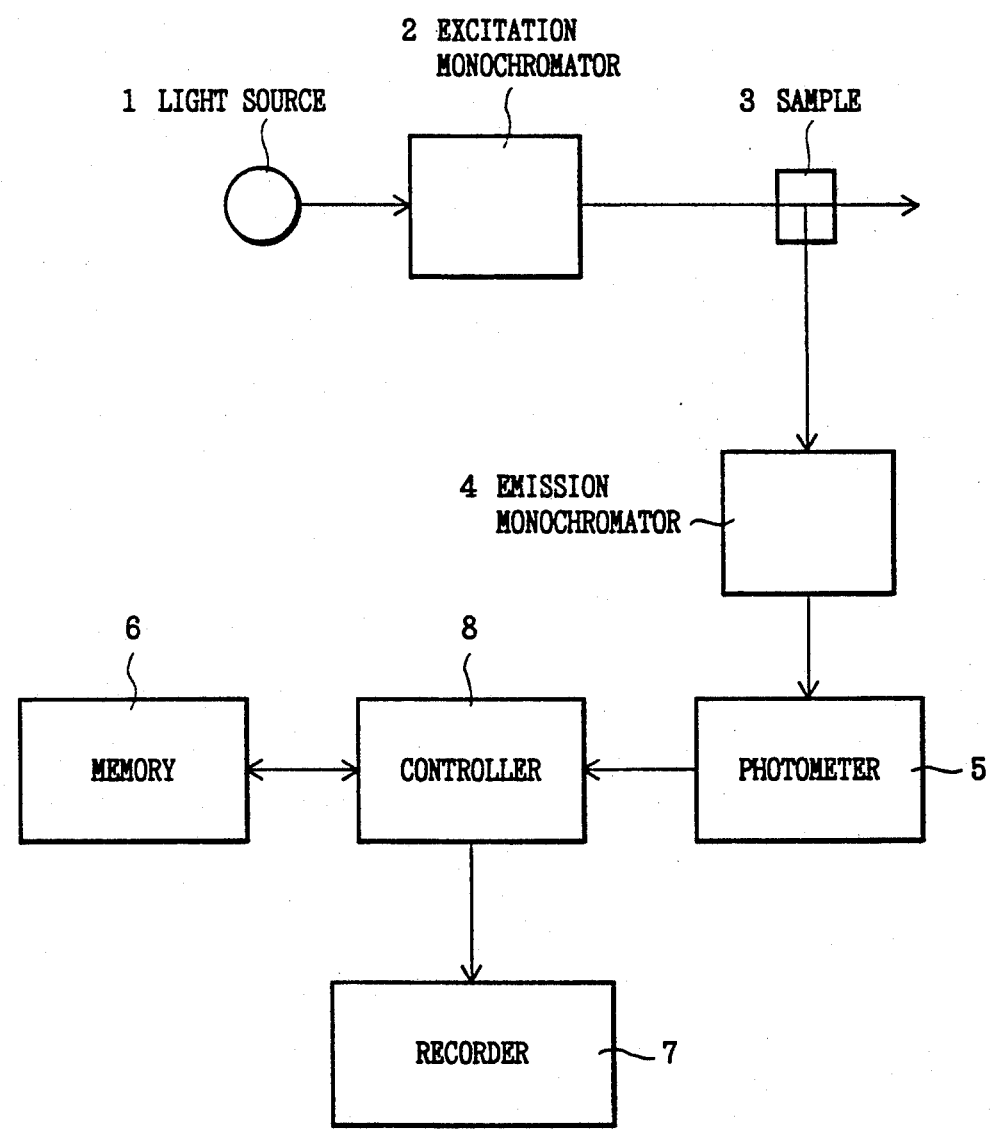
FIG. 1 is a schematic diagram of a fluorescence sample analyzer as an embodiment of the present invention.

A fluorescence sample analyzer as an embodiment of the present invention is schematically shown in FIG. 1. The fluorescence sample analyzer includes a controller 8, which uses a microcomputer, and the controller 8 operates the fluorescence sample analyzer in two modes each corresponding to the two methods described above, i.e,. the emission spectrum measurement mode and the excitation spectrum measurement mode.

Figure 2:
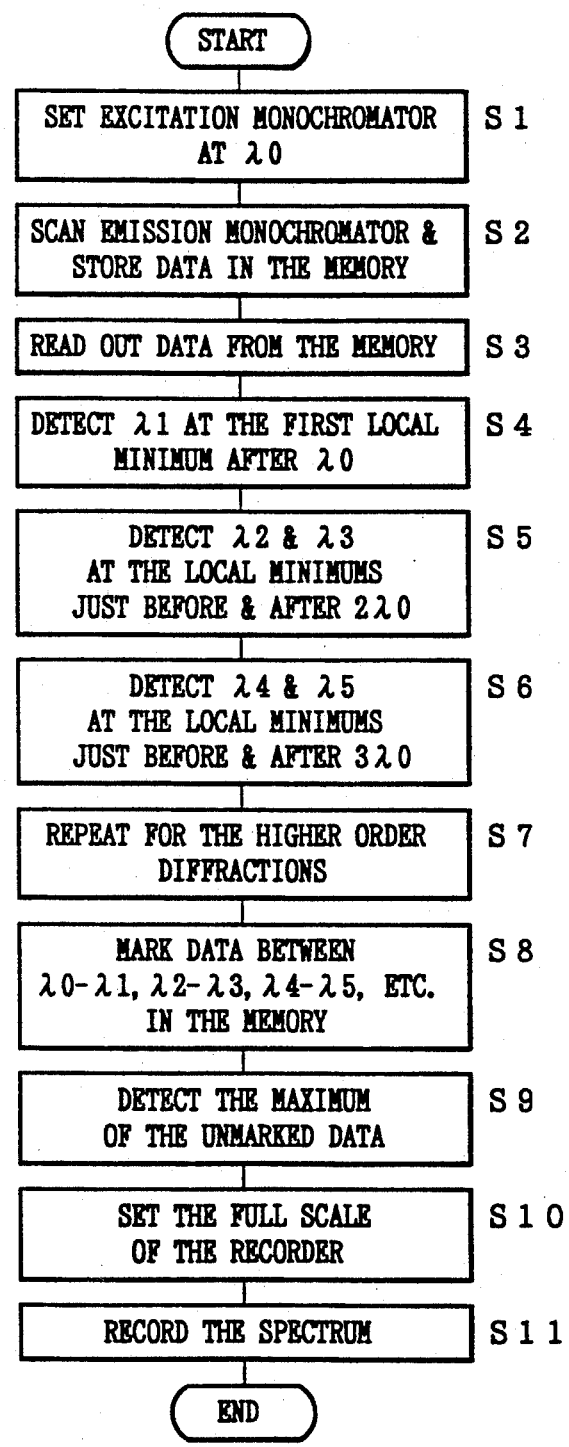
FIG. 2 is a flowchart of an automatic full scale setting operation in the emission spectrum measurement mode.

First the operation of the controller 8 in the emission spectrum measurement mode is described referring to the flowchart of FIG. 2. First, the wavelength of the excitation monochromator 2 is set at an appropriate value λ0 (step S1), and the light source 1 is turned on. The light from the light source 1 is monochromated by the excitation monochromator 2, and the monochromatic light having wavelength λ0 is irradiated onto the sample 3. When the light is irradiated, the sample 3 emits fluorescent light having a certain spectrum shape.

The emission monochromator 4 passes a monochromatic light having wavelength λ of the fluorescent light from the sample 3 at a time, and the wavelength is changed (emission monochromator 4 is scanned) from the wavelength of the excitation light λ0 toward the longer wavelengths. The strength of the monochromatic light selected by the emission monochromator 4 is measured by the photometer 5, and the measured value at every wavelength is stored in the memory 6 by the controller 8 (step S2).

Figure 4:
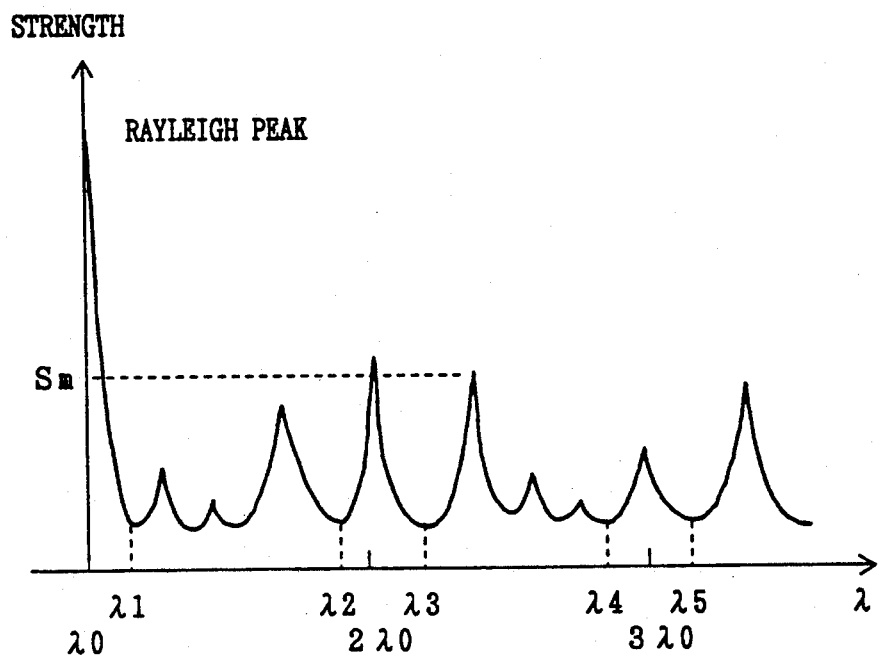
FIG. 4 is an original spectrum curve.

Here, the Rayleigh scattered light, as well as the fluorescent light, enters into the emission monochromator 4, making a peak at the starting point λ0. Peaks of the higher order diffractions of the Rayleigh scattered light having the wavelengths of 2·λ0, 3·λ0, etc. further appear in the spectrum, which is shown in FIG. 4.

The data stored in the memory 6 is then read out sequentially from the wavelength λ0 (step S3), and the wavelength λ1 at the first local minimum after the wavelength λ0 is detected (step S4). Next, the wavelengths λ2 and λ3 at the local minimums just before and just after the second order diffraction (having wavelength 2·λ0) of the Rayleigh scattered light are detected (step S5). Further, the wavelengths λ4 and λ5 at the local minimums just before and just after the third order diffraction (having wavelength 3·λ0) are detected (step S6), and the similar operation is continued to the higher order diffractions if such peaks exist (step S7).

When such wavelengths λ1, λ2, λ3, etc. are determined until step S7, data between λ0 to λ1, data between λ2 to λ3, etc. in the data stored in the memory 6 are marked (step S8). The marking is made to later disregard the peaks of the Rayleigh scattered light and its higher order diffractions from the data in the memory 6. Since data between the neighboring local minimums are marked for disregarding, the number of disregarded data is confined minimum, and the recognizable peaks of the fluorescent light of the sample are not lost.

Figure 5:
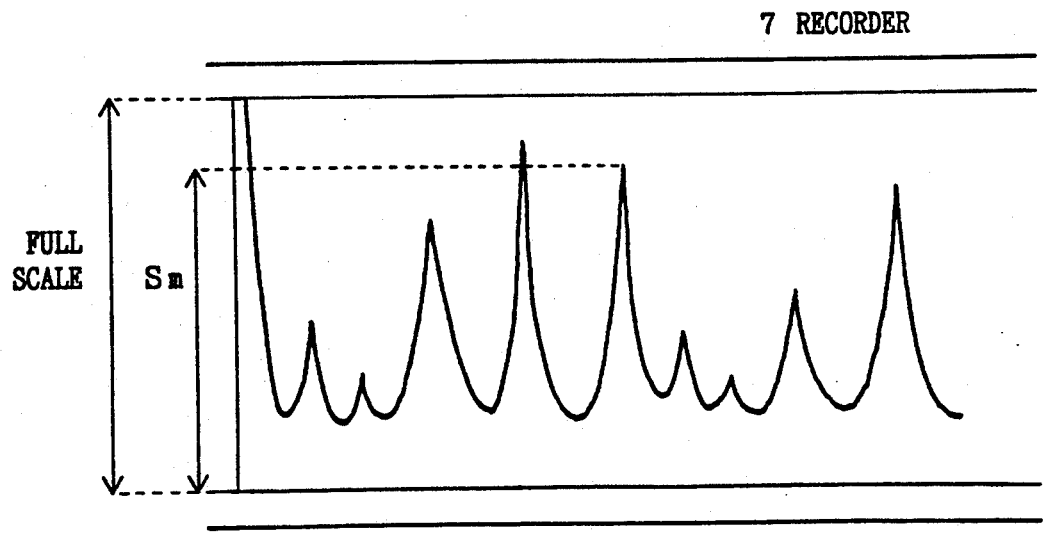
FIG. 5 is a spectrum curve recorded on the recorder of the embodiment.

After that, the maximum Sm of the unmarked data in the memory 6 is detected (step S9), and the maximum value Sm is used to set the full scale of the recorder 7 (step S10). Here it is preferable to set the full scale of the recorder 7 so that the maximum value Sm comes at about 70% of the full scale. When the automatic full scale setting of the recorder 7 is finished, the data in the memory 6 (including the data disregarded in determining the full scale are sent to the recorder 7, whereby the measured data is recorded on the recorder 7 as a spectrum (step S11), as shown in FIG. 5.

In the above description of the embodiment, the peaks of the diffractions of the Rayleigh scattered light are also disregarded as well as the basic Rayleigh scattered light. It is possible, however, to disregard only the peak of the basic Rayleigh scattered light since it is the highest in the spectrum curve and in many cases the peaks of the second, third or higher order diffractions do not affect the full scale setting so much.

Figure 3:
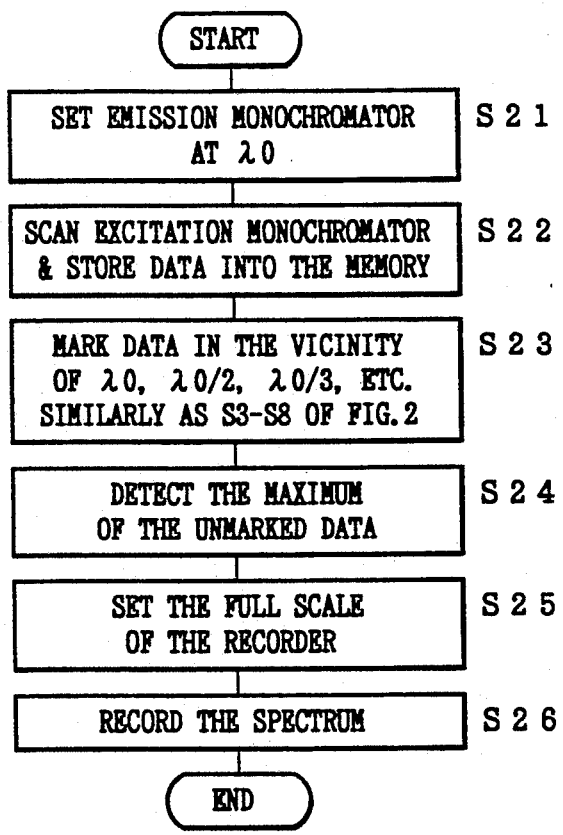
FIG. 3 is a flowchart of an automatic full scale setting operation in the excitation spectrum measurement mode.

The operation of the fluorescence sample analyzer in the excitation spectrum measurement mode is now described referring to the flowchart of FIG. 3. First the emission monochromator 4 is set at an appropriate wavelength λ0 (step S21). Then the excitation monochromator 2 is scanned starting from the wavelength λ0 toward the shorter wavelengths, and the strength of monochromatic light at every wavelength is measured and stored in the memory 6 (step S22). Here, into the photometer 5, enters the Rayleigh scattered light and the second, third and higher order diffractions of excitation light having shorter wavelengths such as ($\frac{1}{2}$)·λ0 and ($\frac{1}{3}$)·λ0, etc. which are diffracted by the emission monochromator 4 set at the wavelength λ0.

Since peaks of these lights appear in the measured spectrum, operation similar to that shown by the steps S3 to S8 of FIG. 2 can be done to mark data in the vicinity of the wavelengths λ0, ($\frac{1}{2}$)·λ0, ($\frac{1}{3}$)·λ0, etc. in the spectrum curve (step S23). Then, similarly to the steps S9 to S11, the maximum of the unmarked data in the memory 6 is detected (step S24), the full scale of the recorder 7 is determined (step S25), and the measured data stored in the memory 6 are recorded by the recorder 7 (step S26).

In the emission spectrum measurement mode, light due to the Raman effect (the light is hereinafter referred to as the Raman light) in the sample is in some cases stronger than the fluorescent light of the sample. In this case, the full scale of the spectrum recording is determined by the peak of the Raman light in the operation of FIG. 2, which is still undesirable to the exact measurement of the fluorescent light of the sample.

Figure 6:
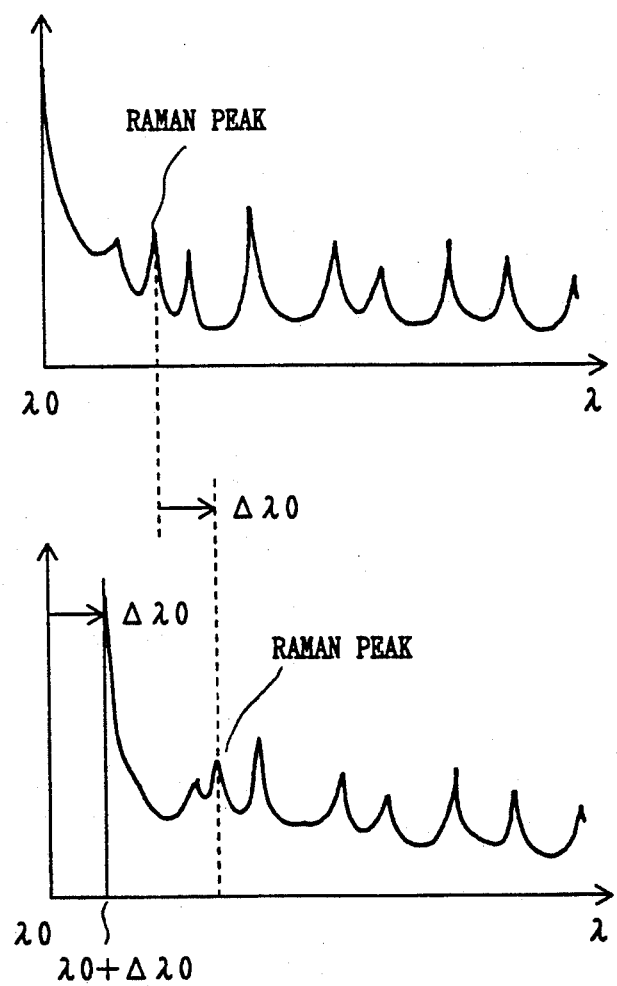
FIG. 6 is graphs showing how a Raman peak appears.

Since the peak of the Raman light appears after the excitation light with a distance proper to the sample, the peak of the Raman light can be detected as follows (FIG. 6). The excitation monochromatic light is slightly changed from the fixed wavelength λ0 to another wavelength λ0+Δλ0 and the spectrum is measured by the emission monochromator. When the two spectrum curves corresponding to the excitation light of λ0 and that of λ0+Δλ0 are compared, the peak that shifts along with the change in the excitation monochromatic light Δλ0 is determined as the Raman peak.

These operations can be included in the automatic full scale setting operation of FIG. 2. That is, if the highest peak determined at step S9 is suspected to be due to the Raman light, the operation described above (i.e., the spectrum is measured again with the excitation light slightly changed) is performed by the controller 8 to decide whether the peak is actually due to the Raman light or not. When the highest peak determined at step S9 is decided to be due to the Raman light, the data in the vicinity of the Raman peak in the memory 6 are further marked using the same method as shown by the steps S5 to S8, and the full scale of spectrum recorder is determined based on the maximum value of the unmarked data.

Figure 7:
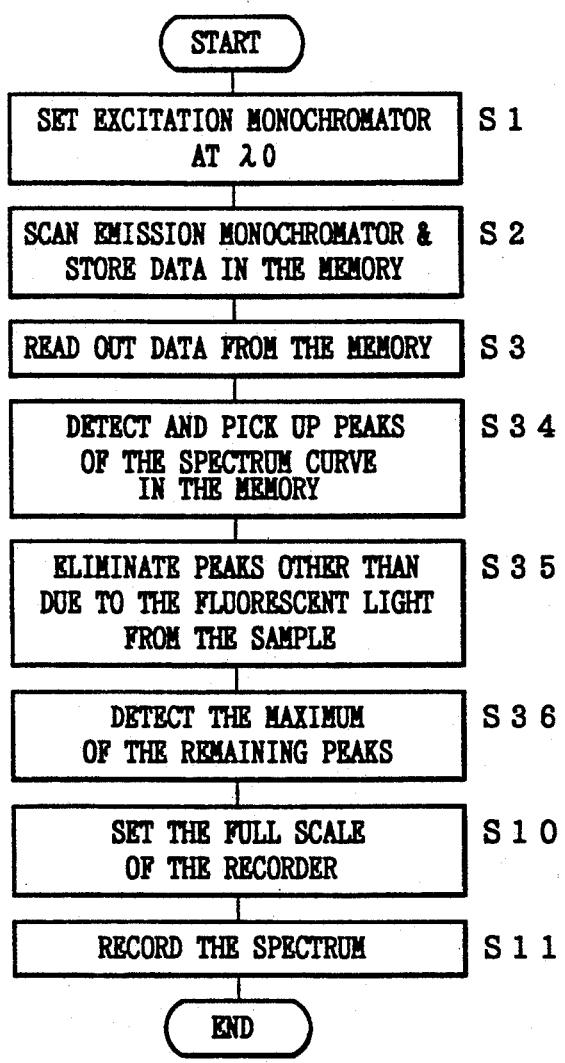
FIG. 7 is a flowchart of another automatic full scale setting method in the emission spectrum measurement mode.

Another embodiment of the present invention is now described referring to the flowchart of FIG. 7. In the present embodiment, after the data of the spectrum curve are stored in the memory 6 by the steps S1 to S3 of FIG. 2, peaks of the spectrum curve are detected and picked up (step S34). Here, a peak can be detected by searching a local maximum in the spectrum curve. When all the peaks of the spectrum curve are picked up, peaks of the Rayleigh scattered light, its higher diffractions and the Raman light are eliminated from the pickedup peak list (step S35). Here, since the position of the second, third or higher order diffractions of the Rayleigh peak may shift slightly from the proper position due to inevitable errors of the apparatus, it is preferable to make the detection of the diffraction peaks with an allowance corresponding to such errors.

After the inappropriate peaks are eliminated, the maximum of the peaks remaining in the picked-up list (i.e., peaks of the fluorescent light of the sample) is detected (step S36), followed by the steps S10 and S11 of FIG. 2 to set the full scale of the recorder 7 according to the detected maximum and to record the spectrum curve.

The method of this embodiment is more efficient than the previously described embodiment (FIG. 2) because it is sufficient to detect only the local maximums of the spectrum curve in this embodiment, while it is necessary to detect the local maximums as well as local minimums in the previous embodiment. Though the description of this embodiment is for the emission spectrum measurement mode, the method of this embodiment can also be applied to the excitation spectrum measurement mode.

What is claimed is:

1. A fluorescence measurement apparatus for analyzing a spectrum curve of fluorescent light emitted from a sample irradiated by an excitation light, comprising:
   an excitation light generator;
   an emitted light detector;
   scanning means for holding one of the emitted light detector and the excitation light generator at a fixed wavelength and scanning the other of the emitted light detector and excitation light generator over a range of wavelengths;
   a memory for storing data of the spectrum curve; and
   analyzing means for analyzing the stored data to determine data corresponding to peaks of the spectrum curve about multiples of the fixed wavelength and data corresponding to minima of the spectrum curve adjacent the determined peaks, and for generating a corrected spectrum curve by disregarding data between the determined minima corresponding to the determined peaks;
   scale setting means for detecting a maximum peak value of the corrected spectrum curve and setting a scale based on the detected maximum peak value; and
   a recorder for recording the corrected spectrum curve, wherein a full scale of the recorder is set to the scale set by the scale setting means.

2. The fluorescence measurement apparatus of claim 1, wherein the analyzing means further determines data corresponding to a Raman effect peak of the spectrum curve and minima adjacent the Raman effect peak, and further generates the corrected spectrum curve by removing from the memory data between the determined minima corresponding to the Raman effect peak.

3. A fluorescence measurement apparatus for analyzing a spectrum curve of fluorescent light emitted from a sample irradiated by an excitation light, comprising:
   an excitation light generator;
   an emitted light detector;
   scanning means for holding one of the emitted light detector and the excitation light generator at a fixed wavelength and scanning the other of the emitted light detector and excitation light generator over a range of wavelengths;
   a memory for storing data of the spectrum curve; and
   analyzing means for analyzing the stored data to determine data corresponding to peaks of the spectrum curve about multiples of the fixed wavelength and data corresponding to minima of the spectrum curve adjacent the determined peaks, and for generating a corrected spectrum curve by removing from the memory data between the determined minima corresponding to the determined peaks;
   scale setting means for detecting a maximum peak value of the corrected spectrum curve and setting a scale based on the detected maximum peak value; and
   a recorder for recording the corrected spectrum curve, wherein a full scale of the recorder is set to the scale set by the scale setting means.

4. The fluorescence measurement apparatus of claim 3, wherein the analyzing means removes data from the memory corresponding to a Rayleigh scattered light peak having a wavelength substantially equal to the fixed wavelength.

5. The fluorescence measurement apparatus of claim 4, wherein the data corresponding to peaks of the spectrum curve about integer multiples of the fixed wavelength are generated by diffractions of Rayleigh scattered light.

6. The fluorescence measurement apparatus of claim 3, wherein the scanning means is in an excitation spectrum measurement mode such that the emitted light detector is held at the fixed wavelength and the excitation light generator is varied.

7. The fluorescence measurement apparatus of claim 6, wherein the analyzing means analyzes the stored data to determine peaks corresponding to integer multiples of the fixed wavelength.

8. The fluorescence measurement apparatus of claim 3, wherein the scanning means is in an emission spectrum measurement mode such that the excitation light generator is held at the fixed wavelength and the emitted light detector is varied.

9. The fluorescence measurement apparatus of claim 8, wherein the analyzing means analyzes the stored data to determine peaks corresponding to integer submultiples of the fixed wavelength.

10. The fluorescence measurement apparatus of claim 3, wherein the analyzing means further determines data corresponding to a Raman effect peak of the spectrum curve and minima adjacent the Raman effect peak, and further generates the corrected spectrum curve by removing from the memory data between the determined minima corresponding to the Raman effect peak.

11. A fluorescence measurement apparatus for analyzing a spectrum curve of fluorescent light emitted from a sample irradiated by an excitation light, comprising:
    an excitation light generator;
    an emitted light detector;
    scanning means for holding one of the emitted light detector and the excitation light generator at a fixed wavelength and scanning the other of the emitted light detector and excitation light generator over a range of wavelengths;
    a memory for storing data of the spectrum curve; and
    analyzing means for analyzing the stored data to determine data corresponding to peaks of the spectrum curve about multiples of the fixed wavelength and data corresponding to minima of the spectrum curve adjacent the determined peaks, and for generating a corrected spectrum curve by marking the data between the determined minima corresponding to the determined peaks;
    scale setting means for detecting a maximum peak value of unmarked data of the corrected spectrum curve and setting a scale based on the detected maximum peak value; and a recorder for recording the corrected spectrum curve, wherein a full scale of the recorder is set to the scale set by the scale setting means.

12. The fluorescence measurement apparatus of claim 11, wherein the analyzing means removes data from the memory corresponding to a Rayleigh scattered light peak having a wavelength substantially equal to the fixed wavelength.

13. The fluorescence measurement apparatus of claim 12, wherein the data corresponding to peaks of the spectrum curve about integer multiples of the fixed wavelength are generated by diffractions of Rayleigh scattered light.

14. The fluorescence measurement apparatus of claim 11, wherein the scanning means is in an excitation spectrum measurement mode such that the emitted light detector is held at the fixed wavelength and the excitation light generator is varied.

15. The fluorescence measurement apparatus of claim 14, wherein the analyzing means analyzes the stored data to determine peaks corresponding to integer multiples of the fixed wavelength.

16. The fluorescence measurement apparatus of claim 11, wherein the scanning means is in an emission spectrum measurement mode such that the excitation light generator is held at the fixed wavelength and the emitted light detector is varied.

17. The fluorescence measurement apparatus of claim 16, wherein the analyzing means analyzes the stored data to determine peaks corresponding to integer submultiples of the fixed wavelength.

18. The fluorescence measurement apparatus of claim 11, wherein the analyzing means further determines data corresponding to a Raman effect peak of the spectrum curve and minima adjacent the Raman effect peak, and further generates the corrected spectrum curve by marking data between the determined minima corresponding to the Raman effect peak.

* * * * *